(12) United States Patent
Tanabe et al.

(10) Patent No.: US 12,415,903 B2
(45) Date of Patent: Sep. 16, 2025

(54) PSEUDO NARCOTIC TRAINING DEVICE

(71) Applicant: The Government of the United States of America, as represented by the Secretary of Homeland Security, Washington, DC (US)

(72) Inventors: Kristine K. Tanabe, Chino Hills, CA (US); Randall G. Mattoon, Keller, TX (US); Jason S. Kropiewnicki, Stephenson, VA (US); Jonathan G. McGrath, Kingwood, TX (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/990,523

(22) Filed: Dec. 20, 2024

(65) Prior Publication Data

US 2025/0223424 A1 Jul. 10, 2025

Related U.S. Application Data

(60) Provisional application No. 63/618,745, filed on Jan. 8, 2024.

(51) Int. Cl.
*C08K 3/36* (2006.01)
*C08K 5/09* (2006.01)

(52) U.S. Cl.
CPC . *C08K 3/36* (2013.01); *C08K 5/09* (2013.01)

(58) Field of Classification Search
None
See application file for complete search history.

(56) References Cited

PUBLICATIONS

Vu, Doan-Trant T., 2001, SPME/GC-MS Characterization of Volatiles Associated with Methamphetamine: Toward the Development of a Pseudomethamphetamine Training Material, Journal Forensic Sciences,, vol. 46, No. 5, Sep. 2001, pp. 1014-1024.
Garg, Anuradha, et al., "Forced-degradation-of-fentanyl: Identification and analysis of impurities and degradants," Journal of Pharmaceutical Biomedical Analysis 53 (2010), pp. 325-334.
Mcgannn, John P., (2017), "Poor-human-olfaction is a 19th-century myth", May 12, 2017, Science, vol. 356, No. 6338,eaam7263(2017), DOI:10.1126/science.aam7263.
Simon, Alison, et al., "A Review of the Types of Training Aids Used for Canine Detection Training", Frontiers in Veterinary Science, vol. 7, Jun. 5, 2020.
Vaughan, Stephanie R. et al., "Identification of volatile components in the headspace of pharmaceutical-grade fentanyl", Forensic Chemistry, vol. 24, (2021).
Trawiński, Jakub, et al., "Photochemical transformation of fentanyl under the simulated solar radiation—Enhancement of the process by heterogeneous photocatalysis and in silico analysis of toxicity", Science of the Total Environment, vol. 791, (2021).
CFSRE—The Center for Forensic Science Research & Education "Fentanyl Purity, Potency, & Synthesis: Real-Time Testing of Opioid Drug Products in the United States", Aug. 16, 2022, https://www.cfsre.org/nps-discovery/drug-checking/fentanyl-purity-potency-synthesis-real-time-testing-of-opioid-drug-products-in-the-united-states.
Fulton, Ashley C., et al., "Investigation of volatile organic compounds from trace fentanyl powder via passive degradation", Forensic Chemistry, vol. 31, (2022).
Ciesielski, Austin L. et al., "Characterization of fentanyl HCl powder prior to and after systematic degradation", Journal of Forensic Sciences, (2022); 67.
Toske, Steven G. et al., "Organic impurity profiling of fentanyl samples associated with recent clandestine laboratory methods", Journal of Forensic Science (2023); vol. 68, pp. 1470-1483.
"OSAC draft Standard for the Systematic Verification of Alternative Training Aids for Detection Caine Disciplines" v1.0, Organization of Scientific Area Committees for Forensic Science Sep. 2024, OSAC 2024-S-0023.
Simon, Alison G. et al., "A method for validating a non-hazardous canine training aid", Frontiers in Analytical Science, vol. 3, (2023) Aug. 16, 2023.

*Primary Examiner* — Layla D Berry
(74) *Attorney, Agent, or Firm* — Kelly G. Hyndman; Robert W. Busby

(57) ABSTRACT

An example is directed to a pseudo narcotic propionic acid (PA) formulation including a propionic acid; a synthetic silicon dioxide; and a microcrystalline cellulose (MCC). The pseudo narcotic PA may further include at least one of: phenethyl chloride (PEC), phenethyl bromide (PEB), acetic acid, or N,N-diethyl aniline.

12 Claims, 17 Drawing Sheets

| Seizure # | Compound ID | Top 3 odor components | | |
|---|---|---|---|---|
| 3472 | Fentanyl citrate | p-tert-butyl-phenol | 2-isopropyl-5-methyl-1-heptanol | 2-hexyl-1-decanol |
| 3473 | Cyclopropyl fentanyl citrate | Cyclopropane carboxylic acid | 2-ethyl-1-hexanol | Phenol |
| 3474 | Methoxyacetyl fentanyl citrate | Benzaldehyde | (S)-isopropyl lactate | 2-ethyl-1-hexanol |
| 3475 | Furanyl fentanyl citrate | Xylene | Toluene | Trimethylbenzene |
| 3476 | 4-ANPP and lactose | 2-ethyl-1-hexanol | Aniline | N/A |
| 3477 | 4-ANPP | Aniline | Benzyl Alcohol | N-benzylideneaniline |

FIG. 2

| Seizure # | Compound ID | Top 3 odor components | | |
|---|---|---|---|---|
| 3529 | Fentanyl and lactose (powder form) | Propionic acid | Phenol | 2-ethyl-1-hexanol |
| 3530 | Fentanyl and lactose (powder form) | Signal too low | | |
| 3531 | Fentanyl HCl and 4-ANPP (powder form) | Acetic acid | Propionic acid | Phenethyl chloride |
| 3532 | Fentanyl and lactose (solid form) | Propionic acid | 2,2-azobis[2-methyl]-propanenitrile | 1-phenylethanol |
| 3533 | Fentanyl, acetaminophen, and lactose (M30 tablets) | Toluene | Branched hydrocarbons | Phenethyl chloride |
| 3536 | Fentanyl and mannitol (powder form) | 2-ethyl-1-hexanol | Phenethylchloride | N/A |
| 3538 | Fentanyl, lactose, and quinine (Powder from gel capsules) | Unknown | Aniline | Phenol |
| 3539 | Fentanyl and erythritol (solid form) | Signal too low | | |

FIG. 4

Indoor Controlled Lineups using seven canines (three canines newly certified at the academy)

| LINEUP 1 (Familiarization using Trained TARGET) | 1 | 2 | 3 | 4 | 5 | 6 | |
|---|---|---|---|---|---|---|---|
| Canine #1 (newly certified) | B1 | COCAINE - A | D1 | B2 | D2 | D3 | Alert |
| Canine #2 (newly certified) | B1 | COCAINE - A | D1 | B2 | D2 | D3 | Alert |
| Canine #3 (newly certified) | B1 | COCAINE - A | D1 | B2 | D2 | D3 | Alert |
| Canine #4 | B1 | COCAINE - A | D1 | B2 | D2 | D3 | Alert |
| Canine #5 | B1 | COCAINE - A | D1 | B2 | D2 | D3 | Alert |
| Canine #6 | B1 | COCAINE - A | D1 | B2 | D2 | D3 | Alert |
| Canine #7 | B1 | COCAINE - A | D1 | B2 | D2 | D3 | Alert |

Interest/Alerts: 7 of 7

| LINEUP 2 (Familiarization - BLANK) | 1 | 2 | 3 | 4 | 5 | 6 | |
|---|---|---|---|---|---|---|---|
| Canine #1 (newly certified) | B1 | D4 | D1 | B2 | D2 | D3 | NR |
| Canine #2 (newly certified) | B1 | D4 | D1 | B2 | D2 | D3 | NR |
| Canine #3 (newly certified) | B1 | D4 | D1 | B2 | D2 | D3 | NR |
| Canine #4 | B1 | D4 | D1 | B2 | D2 | D3 | NR |
| Canine #5 | B1 | D4 | D1 | B2 | D2 | D3 | NR |
| Canine #6 | B1 | D4 | D1 | B2 | D2 | D3 | NR |
| Canine #7 | B1 | D4 | D1 | B2 | D2 | D3 | NR |

Interest/Alerts: 0 of 7

FIG. 7A

| LINEUP 3 (Familiarization - TARGET) | 1 | 2 | 3 | 4 | 5 | 6 | |
|---|---|---|---|---|---|---|---|
|  | B1 | D2 | D1 | B2 | COCAINE - A | D3 |  |
| Canine #1 (newly certified) | B1 | D2 | D1 | B2 | COCAINE - A | D3 | Alert |
| Canine #2 (newly certified) | B1 | D2 | D1 | B2 | COCAINE - A | D3 | Alert |
| Canine #3 (newly certified) | B1 | D2 | D1 | B2 | COCAINE - A | D3 | Alert |
| Canine #4 | B1 | D2 | D1 | B2 | COCAINE - A | D3 | Alert |
| Canine #5 | B1 | D2 | D1 | B3 | COCAINE - A | D3 | Alert |
| Canine #6 | B1 | D2 | D1 | B2 | COCAINE - A | D3 | Alert |
| Canine #7 | B1 | D2 | D1 | B2 | COCAINE - A | D3 | Alert |

Total Interest/Alerts: 7 of 7

| LINEUP 4 (FC35) | 1 | 2 | 3 | 4 | 5 | 6 | |
|---|---|---|---|---|---|---|---|
|  | D2 | D1 | FC35 - A | B2 | D3 | B1 |  |
| Canine #1 (newly certified) | B2 | FC35 - NR | D1 | D2 | B1 | D3 | Alert |
| Canine #2 (newly certified) | B2 | D1 | D1 | D3 | B1 | D3 | NR |
| Canine #3 (newly certified) | D3 | B1 | B2 | D2 | FC35 - A | D1 | Alert |
| Canine #4 | B1 | D1 | D3 | FC35 - NR | D2 | D1 | NR |
| Canine #5 | D2 | D3 | B2 | D2 | B2 | FC35 - A | Alert |
| Canine #6 | D2 | B2 | D3 | FC35 - A | B1 | D1 | Alert |
| Canine #7 | D3 | FC35 - A | D2 | B1 | D1 | B2 | Alert |

Total Interest/Alerts: 5 of 7

LINEUP 5 (PF35)

| | 1 | 2 | 3 | 4 | 5 | 6 | |
|---|---|---|---|---|---|---|---|
| Canine #1 (newly certified) | D1 | B1 | O2 | *PF35 - NR* | O3 | B2 | NR |
| Canine #2 (newly certified) | B1 | O2 | O3 | *PF35 - A* | B2 | O1 | Alert |
| Canine #3 (newly certified) | O1 | B2 | D3 | O2 | B1 | *PF35 - A* | Alert |
| Canine #4 | B2 | O1 | B1 | D3 | O2 | B1 | NR |
| Canine #5 | O2 | O3 | B1 | O2 | *PF35 - A* | O1 | Alert |
| Canine #6 | *PF35 - A* | O1 | O3 | B2 | O3 | B1 | Alert |
| Canine #7 | B2 | D1 | *PF35 - A* | B1 | O3 | D2 | Alert |

Interest/Alerts: 5 of 7

LINEUP 6 (FCS)

| | 1 | 2 | 3 | 4 | 5 | 6 | |
|---|---|---|---|---|---|---|---|
| Canine #1 (newly certified) | O1 | B2 | *FCS - A* | O3 | B1 | O2 | Alert |
| Canine #2 (newly certified) | O3 | O1 | *FCS - NR* | B1 | O3 | B2 | NR |
| Canine #3 (newly certified) | *FCS - A* | O2 | O1 | B2 | O3 | B1 | NR |
| Canine #4 | B1 | B2 | O3 | O2 | B1 | O1 | Alert |
| Canine #5 | O2 | O3 | *FCS - A* | B2 | O1 | B2 | Alert |
| Canine #6 | B1 | *FCS - A* | O3 | O3 | O2 | B2 | Alert |
| Canine #7 | *FCS - A* | B1 | B1 | *COCAINE - A* | O2 | O3 | Alert |
| Canine #2 Re-do at end | O3 | O1 | D1 | O2 | O1 | B2 | Alert |
| Canine #2 Re-do at end | D3 | D1 | *FCS - A* | O1 | O2 | D3 | Total |

Interest/Alerts: 6 of 7

\* Canine #2 was erratic during Lineup 6, so waited for him to settle down and ran him through the other Lineups after all dogs completed their run.

| LINEUP 7 (BLANK lineup) | 1 | 2 | 3 | 4 | 5 | 6 | |
|---|---|---|---|---|---|---|---|
| Canine #1 (newly certified) | D4 | O3 | B2 | O1 | B1 | O2 | NR |
| Canine #2 (newly certified) | B2 | B1 | D4 | O3 | O2 | O3 | NR |
| Canine #3 (newly certified) | O1 | D4 | B1 | O2 | B2 | B1 | NR |
| Canine #4 | O3 | O1 | O4 | O1 | B2 | O4 | NR |
| Canine #5 | O2 | O3 | D4 | O3 | B1 | B1 | NR |
| Canine #6 | B1 | D4 | O2 | O3 | O2 | O1 | NR |
| Canine #7 | O2 | B1 | O3 | D4 | B2 | O1 | NR |
|  |  |  |  |  |  |  | Total Interest/Alerts: 0 of 7 |

| LINEUP 8 (PFS) | 1 | 2 | 3 | 4 | 5 | 6 | |
|---|---|---|---|---|---|---|---|
| Canine #1 (newly certified) | PFS - A | O1 | B1 | O3 | B2 | O2 | Alert |
| Canine #2 (newly certified) | PFS - A | O3 | O1 | B2 | O2 | B1 | Alert |
| Canine #3 (newly certified) | O1 | B2 | PFS - A | O3 | O1 | B1 | Alert |
| Canine #4 | B2 | O2 | O1 | B1 | PFS - NR | O3 | NR |
| Canine #5 | O2 | O3 | B2 | PFS - A | O1 | B1 | Alert |
| Canine #6 | B1 | O1 | O3 | O2 | B2 | PFS - A | Alert |
| Canine #7 | O1 | B1 | O2 | B2 | O3 | PFS - A | Alert |
|  |  |  |  |  |  |  | Total Interest/Alerts: 6 of 7 |

FIG. 7D

KEY:

Cocaine - 35 g

B1 clean Nitrile Gloves

B2 clean Plastic Resealable Bags

D1 Tide laundry detergent liquid smeared onto paper

D2 Jergens Lotion smeared onto paper

D3 Black electrical tape, taped onto paper

D4 Dog treat (salmon Purina puppy training treat; 1 piece)

FC5 Fentanyl Citrate Control - 5g (triple bagged, heat-sealed)

FC35 Fentanyl Citrate Control - 35g (triple bagged, heat-sealed)

PF5 Pseudo Fentanyl - 5g (triple bagged, heat-sealed)

PF35 Pseudo Fentanyl - 35g (triple bagged, heat-sealed)

Response:

A = alert

I = interest

NR = no response

FIG. 7E

Indoor controlled lineups using eight canines temporarily assigned to port of entry.

| LINEUP 1 (Familiarization - TARGET) | 1 | 2 | 3 | 4 | 5 | 6 | Total Interest/Alerts: 7 of 7 |
|---|---|---|---|---|---|---|---|
| Canine #8 | B1 | COCAINE - A | D1 | B2 | D2 | D3 | Alert |
| Canine #9 | B1 | COCAINE - A | D1 | B2 | D2 | D3 | Alert |
| Canine #10 | B1 | COCAINE - A | D1 | B2 | D2 | D3 | Alert |
| Canine #11 | B1 | COCAINE - A | D1 | B2 | D2 | D3 | Alert |
| Canine #12 | B1 | COCAINE - A | D1 | B2 | D2 | D3 | Alert |
| Canine #13 | B1 | COCAINE - A | D1 | B2 | D2 | D3 | Alert |
| Canine #14 | B1 | COCAINE - A | D1 | B2 | D2 | D3 | Alert |
| Canine #15 | B1 | COCAINE - A | D1 | B2 | D2 | D3 | Alert |

FIG. 8A

| LINEUP 2 (Familiarization - BLANK) | 1 | 2 | 3 | 4 | 5 | 6 | |
|---|---|---|---|---|---|---|---|
| Canine #8 | B1 | D4 | D1 | B2 | D2 | D3 | NR |
| Canine #9 | B1 | D4 | D1 | B2 | D2 | D3 | NR |
| Canine #10 | B1 | D4 | D1 | B2 | D2 | D3 | NR |
| Canine #11 | B1 | D4 | D1 | B2 | D2 | D3 | NR |
| Canine #12 | B1 | D4 | D1 | B2 | D2 | D3 | NR |
| Canine #13 | B1-! | D4 | D1-! | B2 | D2 | D3 | Interest (B1, D1) |
| Canine #14 | B1 | D4 | D1 | B2-! | D2 | D3 | Interest (B2) |
| Canine #15 | B1-! | D4 | D1 | B2 | D2 | D3 | Interest (B1) |

| LINEUP 3 (Familiarization - TARGET) | 1 | 2 | 3 | 4 | 5 | 6 | |
|---|---|---|---|---|---|---|---|
| Canine #8 | B1 | D2 | D1 | B2 | D3 | COCAINE - A | Alert |
| Canine #9 | B1 | D2 | D1 | B2 | D3 | COCAINE - A | Alert |
| Canine #10 | B1 | D2 | D1 | B2 | D3 | COCAINE - A | Alert |
| Canine #11 | B1 | D2 | D1 | B2 | D3 | COCAINE - A | Alert |
| Canine #12 | B1 | D2 | D1 | B2 | D3 | COCAINE - A | Alert |
| Canine #13 | B1 | D2 | D1 | B2 | D3 | COCAINE - A | Alert |
| Canine #14 | B1 | D2 | D1 | B2 | D3 | COCAINE - A | Alert |
| Canine #15 | B1 | D2 | D1 | B2 | D3 | COCAINE - ! | Interest |

Total Interest/Alerts: 7 of 7

FIG. 8B

| LINEUP 4 (PF-3S) | 1 | 2 | 3 | 4 | 5 | 6 | |
|---|---|---|---|---|---|---|---|
| Canine #8 | D1 | B1 | D2 | PF-3Sg - A | D3 | B2 - I | Alert |
| Canine #9 | B1 | D2 | D3 | PF-3Sg - A | B2 - I | D1 | Alert |
| Canine #10 | D1 | B2 - I | D3 | D2 | B1 | PF-3Sg - I | Interest |
| Canine #11 | B2 | D1 | PF-3Sg - I | D3 - I | D2 | B1 - I | Alert |
| Canine #12 | B2 | D3 | B1 | D2 | PF-3Sg - I | D1 - I | Interest |
| Canine #13 | PF-3Sg - I | D1 | D2 | B2 | D3 - I | B1 | Interest |
| Canine #14 | B2 | D1 | PF-3Sg - A | B1 - I | D3 | D2 | Alert |
| Canine #15 | D2 | PF-3Sg - NR | D3 | D1 | B1 | B2 | NR |
| | | | | | | Total Interest/Alerts: | 7 of 8 |

| LINEUP 5 (PF-S) | 1 | 2 | 3 | 4 | 5 | 6 | |
|---|---|---|---|---|---|---|---|
| Canine #8 | PF-Sg - A | D1 | B1 | D3 | B2 | D2 | Alert |
| Canine #9 | D3 | PF-Sg - A | D1 | B2 | B1 | B1 | Alert |
| Canine #10 | D1 | B2 | PF-Sg - I | D3 | B1 | D2 | Interest |
| Canine #11 | B2 | D2 | D1 | B1 | PF-Sg - I | D3 | Interest |
| Canine #12 | D2 | D3 | PF-Sg - A | B2 | D1 | B1 | Alert |
| Canine #13 | D3 | B1 | D1 | PF-Sg - A | D2 | B2 | Alert |
| Canine #14 | B1 | D1 | D3 | D2 | B2 | PF-Sg - A | Alert |
| Canine #15 | D1 | B1 | D2 | B2 | D3 | PF-Sg - A | Alert |
| | | | | | | Total Interest/Alerts: | 8 of 8 |

FIG. 8C

KEY:

Cocaine - 35 g

B1 clean Purple nitrile gloves, 2 rolled together

B2 clean Plastic Bags

D1 Tide laundry detergent liquid smeared onto paper

D2 Jergens Lotion smeared onto paper

D3 Black electrical tape, taped onto paper

D4 Dog treat (salmon Purina puppy training treat; 1 piece)

PF-5g Pseudo Fentanyl - 5g (triple bagged, heat-sealed)

PF-35g Pseudo Fentanyl - 35g (triple bagged, heat-sealed)

Response:

A = alert

I = interest

NR = no response

FIG. 8D

| Outdoor Cargo Examination Environment | Cocaine - 50g Commodity = Strawberries | Distractor Commodity = Strawberries | Pseudo Fentanyl - 50g (Triple-bagged) Commodity = Cheeses/Toasted Grasshoppers | Pseudo Fentanyl - 50g (Single-bagged) Commodity = packages of clothing |
|---|---|---|---|---|
| Canine #1 (newly certified) | Alert | No Response | Alert | Alert |
| Canine #2 (newly certified) | Alert | No Response | No Response | Alert |
| Canine #3 (newly certified) | Alert | No Response | Alert | Alert |
| Canine #4 | Alert | No Response | Alert | Alert |
| Canine #5 | Alert | No Response | Alert | Alert |
| Canine #6 | Alert | No Response | Alert | Alert |
| Canine #7 | Alert | No Response | Alert (but could not locate) | Alert |
| | | | Total Interest/Alerts: 6 of 7 | Total Interest/Alerts: 7 of 7 |

FIG. 9

PSEUDO NARCOTIC TRAINING DEVICE

CROSS-REFERENCE TO RELATED APPLICATIONS

The application claims the benefit of priority from and is a non-provisional of U.S. Provisional Patent Application No. 63/618,745, filed on Jan. 8, 2024, entitled PSEUDO NARCOTIC TRAINING DEVICE, the disclosure of which is incorporated by reference in its entirety.

SUMMARY STATEMENT OF GOVERNMENT INTEREST

The present invention was made with support from the United States Department of Homeland Security (DHS) and by employees of DHS in the performance of their official duties. The U.S. Government has certain rights in this invention.

FIELD

The discussion below relates generally to apparatuses and methods for contraband odor detection training such as an alternative canine training aid for canine detection of contraband by odor and, more specifically, to a safe, non-toxic, low cost, non-controlled substance formulation for a pseudo narcotic canine training aid that mimics the odor of fentanyl.

BACKGROUND

Fentanyl is a potent synthetic opioid and a DEA Schedule II Controlled Substance that is often encountered by law enforcement as an illegal narcotic substance. In 2022, the Drug Enforcement Agency (DEA) reported that an astounding 80 percent of fentanyl in America entered the country through the U.S.-Mexico border. Fentanyl poses a significant threat to the safety, health, and national security of the American people. Since 2017, fentanyl has been responsible for more than half of all yearly opioid-related deaths. These deaths are primarily due to the use of illicitly manufactured synthetic opioids in the form of fentanyl. Canine drug detection training currently relies on using real fentanyl materials for both initial canine training and for biweekly maintenance training performance checks for canines deployed for enforcement operations.

SUMMARY

While it is best practice to use real target materials for canine imprinting, annual certifications, and regular maintenance training, it is preferable to develop a pseudo narcotic fentanyl formulation that can be used directly by canine handlers in the operational environment for more frequent (e.g., daily) performance checks and is safe, non-toxic, and not composed of a controlled substance. There is a need to develop a pseudo narcotic formulation that is a mimic of the odor of fentanyl, composed of chemical(s) that imitate the real odor of the fentanyl target material, in order to perform frequent (e.g., daily) verifications of the performance of canines deployed in field operations, particularly for performance checks directly in the environments where the canine enforcement operations take place (e.g., exposure training). Pseudo narcotic training aids are also useful as alternative canine training aids when the use of actual narcotics may not be feasible, due to cost, handling, storage, safety, controlled access, security issues, or training environment considerations. A pseudo narcotic formulation of fentanyl can also be used to improve and refine the precision of canine detection activities due to the ease of physical manipulation of the training aid material (e.g., placing the material in small voids or compartments for training activities).

The training aid material can be used by itself for canine fentanyl detection training if real fentanyl cannot be used, or to supplement canine training using real fentanyl training aids to conduct frequent performance checks, when real fentanyl is not readily available. This material can also be used to detect fentanyl in its various forms commonly encountered in drug detection operations (e.g., powders and tablets). Because this pseudo fentanyl material is produced in the laboratory environment and its formulation provides consistent odor availability, its concentrations can be adjusted up or down (e.g., 10-fold, 100-fold, 1000-fold) to provide a consistent variety of odor concentrations for various canine training scenarios. Straightforward methods to produce this pseudo fentanyl formulation can make materials readily available to fulfill canine training aid needs, as opposed to the high cost and complexities of law enforcement canine drug detection programs for purchasing, synthesizing, or using seizures of real fentanyl. Additional chemicals that are mimics of the odor of fentanyl based on their prevalence in seizures of illicitly manufactured fentanyl can also be added to this formulation. This material and additional mimic formulations could also be used as a surrogate target material for the use and development of other chemical sensing devices, such as stand-off detectors.

Pseudo narcotic training aids are developed by characterizing the major chemical components found in the odor of the real target material and developing a formulation composed of the most prevalent or recurring volatile organic chemicals, but not using the real target physical material in the formulation. See Simon A., Lazarowski L., Singletary M., Barrow J., Van Arsdale K., Angle T., Waggoner P., and Giles K., "A Review of the Types of Training Aids Used for Canine Detection Training," *Front. Vet. Sci.* 7:313 (2020). For example, a candidate chemical was identified by characterizing the volatile organic chemicals from seizures of methamphetamine and evaluating canine detection response for those chemicals through canine trials to ascertain the specific volatile chemical(s) of "odor value" that is perceived as significant to the dog. See Vu D., "SPME/GC-MS characterization of volatiles associated with methamphetamine: Toward the development of a pseudomethamphetamine training material. *J For Sci.* 46:1014 (2011).

According to embodiments of the present invention, a pseudo formulation of fentanyl was developed by analyzing several seizures of fentanyl and fentanyl-related materials to identify the most common chemical component in the materials' chemical odor profile. Further development included conducting canine trials using canines newly trained and certified for the detection of real fentanyl and untrained, "green" canines trained to the odor of the pseudo narcotic formulation. Additional development included conducting canine trials in the field environment using newly trained and certified canines and canines with operational experience. These chemical characterization strategies and canine assessments align with methods recommended by the relevant scientific community for verifying the utility of alternative training aids. See Simon A., Lazarowski L., Krichbaum S., Singletary M., Angle C., Waggoner P., Van Arsdale K., and Barrow J., "A method for validating a non-hazardous canine training aid," Frontiers in Analytical Science, 3 (2023); and National Institute of Standards and Technology, Organization of Scientific Area Committees, OSAC Proposed Standard posted for Public Comment OSAC 2024-S-0023, *Standard for the Systematic Verification of Alternative Training Aids for Detection Canine Disciplines* (September 2024).

An aspect is directed to a pseudo narcotic propionic acid (PA) formulation comprising: a propionic acid; a synthetic silicon dioxide; and a microcrystalline cellulose (MCC).

Another aspect is directed to a method of preparing a pseudo narcotic propionic acid (PA). The method comprises: weighing out a microcrystalline cellulose (MCC); weighing out and transferring a synthetic silicon dioxide to a blender; adding a PA to the synthetic silicon dioxide in the blender; blending the PA and the synthetic silicon dioxide in the blender to form a first mixture; and adding the MCC to the first mixture in the blender and blending the MCC and the first mixture to form a second mixture as the pseudo narcotic PA.

Yet another aspect is directed to a method of preparing a pseudo narcotic propionic acid (PA). The method comprises: weighing out and transferring a synthetic silicon dioxide to a blender; weighing out a microcrystalline cellulose (MCC) having a weight of a same order of magnitude as the synthetic silicon dioxide; adding PA to the synthetic silicon dioxide in the blender; blending the PA and synthetic silicon dioxide in the blender to form a first mixture; adding the MCC to the first mixture in the blender and blending the MCC and the first mixture to form a second mixture; weighing out and transferring the MCC having a weight of at least ten times the weight of the synthetic silicon dioxide to a mixer; adding the second mixture to the MCC in the mixer; and mixing the second mixture and the MCC in the mixer to form a third mixture as the pseudo narcotic PA.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 2 is a table illustrating initial SPME/GC-MS screening analysis of samples from six seizures of fentanyl, fentanyl analogues, and fentanyl precursor chemicals and their top three odor components.

FIG. 4 is a table illustrating SPME/GC-MS results of samples from the eight fentanyl seizures of FIG. 3.

FIGS. 7A-7E show the results of the initial indoor controlled trial with the seven canines that included three newly certified canines and four canines already operating at the port of entry.

FIGS. 8A-8D show the results of the subsequent trial using eight different canines that were temporarily assigned to the port of entry.

FIG. 9 is the table of results from an outdoor trial for the pseudo fentanyl formulation using seven certified canines operating at the port of entry (including three canines newly certified at the academy).

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Embodiments of the present invention are directed to a safe, non-toxic, non-controlled substance formulation for a canine training aid that is a pseudo narcotic formulation based on the odor of fentanyl. Canine mimic training aids contain chemical(s) selected with the goal of imitating the real odor of the trained target material. "Pseudo" narcotic canine training aids specifically contain representative components (in whole or in part) found in the chemical odor profile (SPME/GC-MS headspace results) of the real target material without actually including the real physical imprinted or trained material in the composition of the formulation. See National Institute of Standards and Technology, Organization of Scientific Area Committees, OSAC Proposed Standard posted for Public Comment OSAC 2024-S-0023, *Standard for the Systematic Verification of Alternative Training Aids for Detection Canine Disciplines* (September 2024). In one embodiment, a pseudo narcotic formulation represents a single signature component that was determined from an analysis of multiple fentanyl seizures encountered during drug enforcement operations. Canine field trials are used to assess the canine performance using the pseudo narcotic formulation.

Laboratory Analysis of Fentanyl Seizures

The researchers initially screened six seizures obtained from drug enforcement operations that consisted of highly pure fentanyl, fentanyl analogues, and fentanyl precursor chemicals. The screening process used SPME/GC-MS headspace analysis to determine the types of chemical odors that could be associated with fentanyl.

Figure 1:
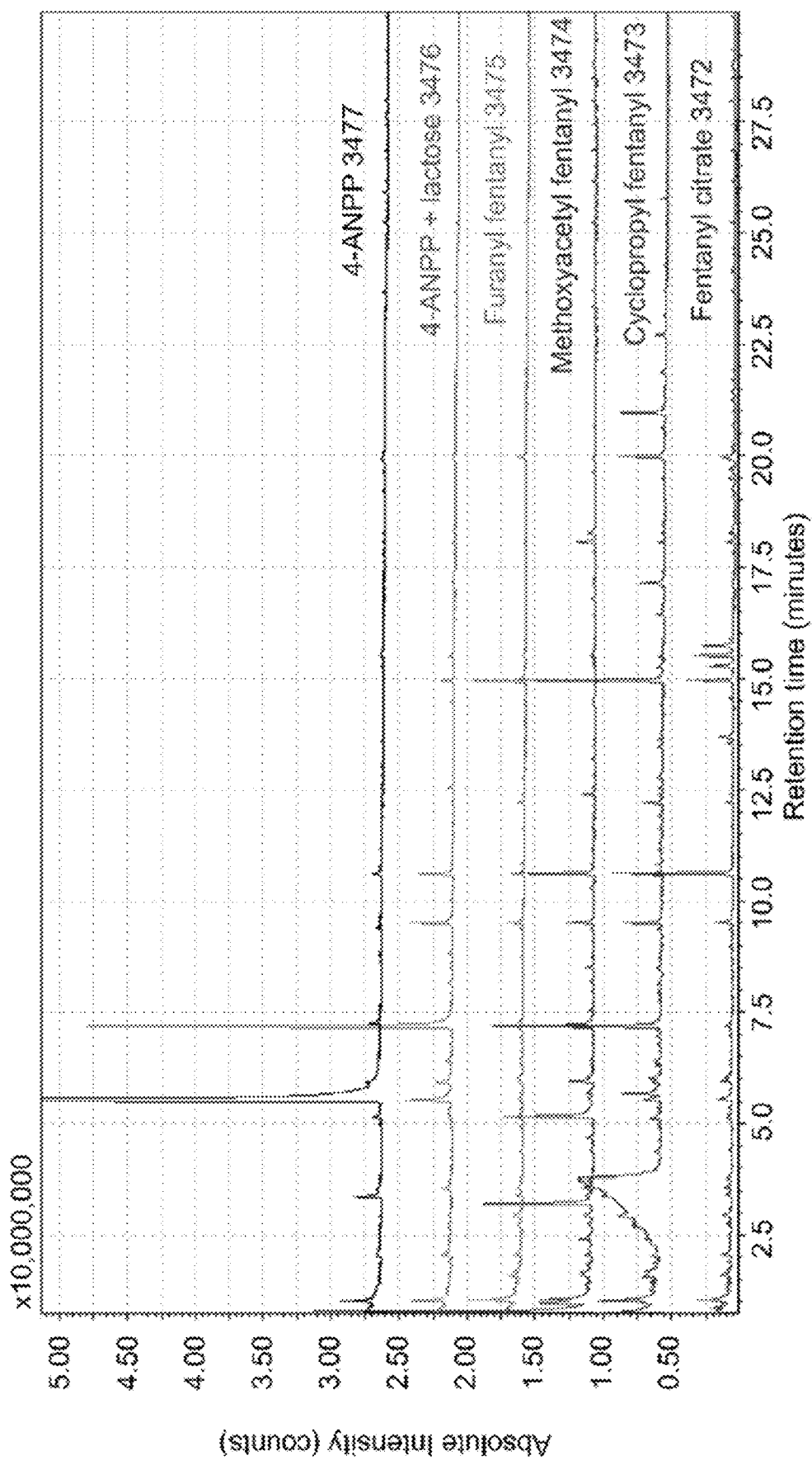
FIG. 1 is a graphical diagram illustrating the initial solid phase microextraction gas chromatography-mass spectrometry (SPME/GC-MS) headspace screening analysis of samples from six seizures of fentanyl, fentanyl analogues, and fentanyl precursor chemicals.

FIG. 1 is a graphical diagram illustrating the initial SPME/GC-MS screening analysis of samples from seizures of fentanyl, fentanyl analogues, and fentanyl precursor chemicals. All six seizures were first characterized using Fourier transform infrared spectroscopy (FT-IR) and gas chromatography-mass spectrometry (GC-MS) analysis, which found that the seizures contained fentanyl citrate (3472), cyclopropyl fentanyl citrate (3473), methoxyacetyl fentanyl citrate (3474), furanyl fentanyl citrate (3475), 4-anilino-N-phenethylpiperidine (4-ANPP) with lactose (3476), and 4-ANPP (3477).

FIG. 2 is a table illustrating initial SPME/GC-MS screening analysis of samples from the six seizures of fentanyl, fentanyl analogues, and fentanyl precursor chemicals and their top three odor components. All six seizures were analyzed under the same SPME/GC-MS conditions and resulted in six chromatograms with varying odor profiles, as seen in FIGS. 1 and 2. Surprisingly, the chromatogram of fentanyl citrate exhibited very low signals overall and did not appear to have any distinctive odors. Further analysis of the remaining five seizures found that three of the seizures did exhibit a unique odor component. Specifically, the chromatogram of cyclopropyl fentanyl citrate contained one large peak that was identified as cyclopropane carboxylic acid while both 4-ANPP seizures contained one large peak identified as aniline. The presence of these components were indicative of reagents and byproducts from their synthetic routes. Based on these results, it was hypothesized that the key signature pseudo odor(s) for fentanyl could possibly be derived from the synthetic route of fentanyl.

Fentanyl seizures were next obtained and analyzed to determine if any distinctive odors associated with the fentanyl synthesis route and/or degradation products could be detected based on the known synthetic routes and precursor chemicals. See Fentanyl Purity, Potency, & Synthesis. Real-Time Testing of Opioid Drug Products in the United States, Center for Forensic Science Research and Education (2022). All seizures were characterized via FT-IR and GC-MS analysis to confirm the presence of fentanyl and any other components.

Figure 3:
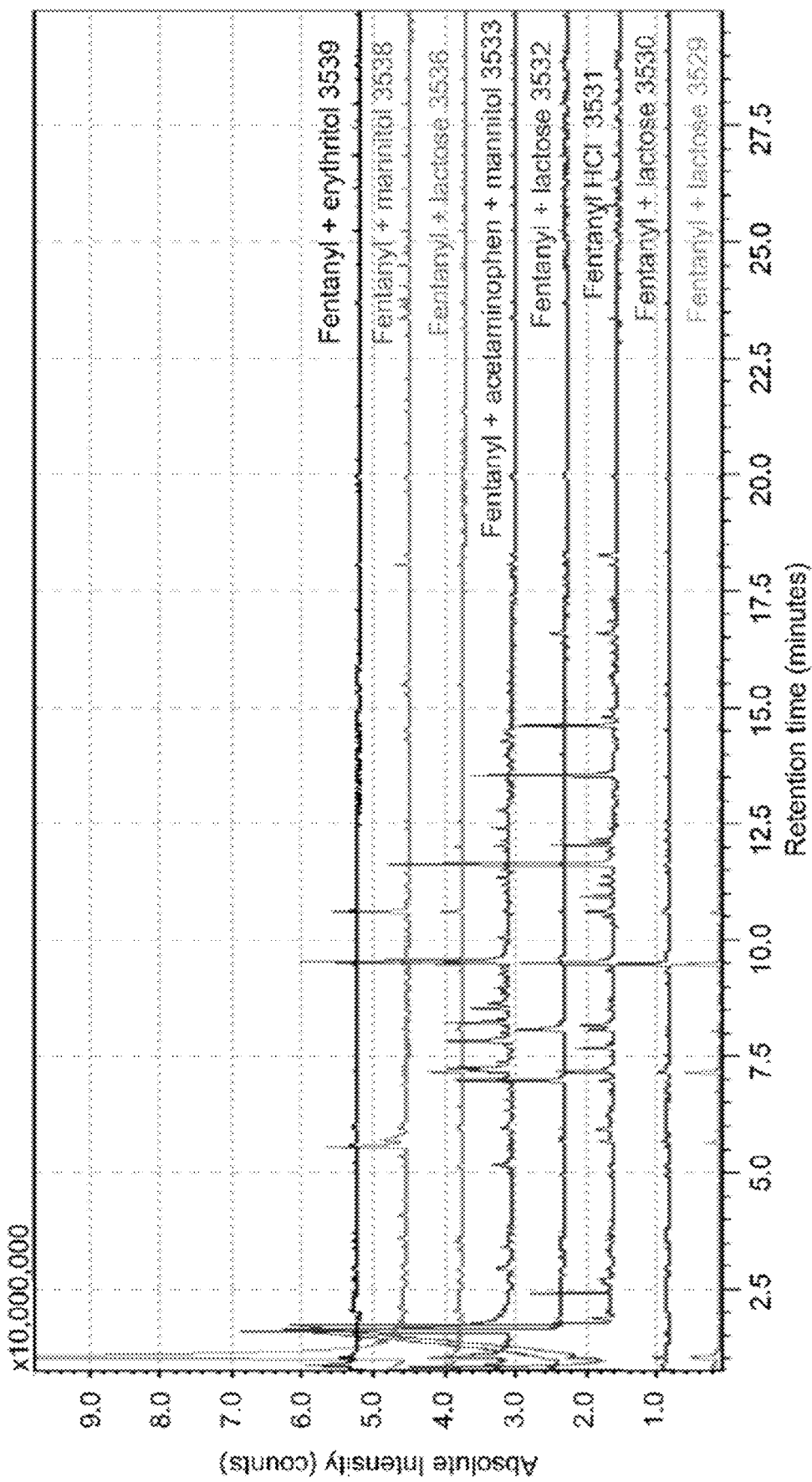
FIG. 3 is a graphical diagram illustrating the SPME/GC-MS analysis of samples from eight fentanyl seizures.

FIG. 3 is a graphical diagram illustrating the SPME/GC-MS analysis of samples from eight fentanyl seizures. FIG. 4 is a table illustrating SPME/GC-MS results of samples from the eight fentanyl seizures of FIG. 3. SPME/GC-MS analysis overall revealed propionic acid as a common odor component detected in three out of the eight seizures, and a predominant odor in the fentanyl bulk powder form.

Thirty-one additional fentanyl seizures were subsequently analyzed to determine if propionic acid was present. A wide range of seizures were analyzed, which included both powders and tablets as well as mixtures consisting of various cutting agents (e.g., lactose, mannitol, inositol), adulterants (e.g., acetaminophen, lidocaine), and other controlled substances (tramadol, p-fluorofentanyl). Overall, nineteen out of thirty-nine seizures total were found to contain propionic acid, with thirteen of those seizures consisting of powders/solids and six of those seizures consisting of tablets.

While the SPME/GC-MS analysis method identified propionic acid in half of the fentanyl seizures, canines may be able to detect propionic acid from fentanyl materials at levels below the limit of detection of this particular type of laboratory analysis. Subsequent SPME/GC-MS studies of 15 high-purity fentanyl bulk powder seizures have found propionic acid as a common component of the odor.

Based on recent literature that assessed the volatile organic chemicals associated with fentanyl, it is noted that the researchers did not detect propionic acid as a component of the odor. Vaughan, S. R., DeGree ff, L. E., Forte, L., Holness, H. K., Furton, K. G., "Identification of volatile components in the headspace of pharmaceutical-grade fentanyl," *Forensic Chemistry*, 24, 100331 (2021); Fulton, A. C., Forte, L., Vaughan, S. R., Holness, H. K., Furton, K. G., DeGree ff, L. E. Investigation of volatile organic compounds from trace fentanyl powder via passive degradation, *Forensic Chemistry*, 31, 100456 (2022); and Ciesielski A. L., Simon A. G., Welch K., Wagner J. R., "Characterization of fentanyl HCl powder prior to and after systematic degradation," *J. Forensic Sci.* 67, 1979-1988 (2022). That may be due to the researchers' use of high-purity, commercially manufactured fentanyl purchased from a reputable chemical supplier. Upon reviewing the available fentanyl synthesis routes, it is theorized that the presence of propionic acid detected in the seizure materials may be due to unreacted precursors of propionyl chloride and/or propionic anhydride which are necessary in the synthesis of fentanyl to add the propionyl group to the fentanyl structure, regardless of which synthetic route is used. Both of these precursors are highly reactive with water, with propionyl chloride forming propionic acid and hydrochloric acid, and propionic anhydride decomposing into propionic acid.

It is also possible that the presence of propionic acid is due to the degradation of fentanyl. One of the prior noted studies (Vaughan et al.) found that forced thermal degradation produces 4-ANPP, and thus the loss of the propionyl group. Another study found that acid degradation of fentanyl resulted in the exclusive formation of 4-ANPP (designated by the researchers as "PPA", or N-phenyl-1-(2-phenylethyl)-piperidin-4-amine) at a level of nearly 35%. Garg, A., Solas, D. W., Takahashi, L. H., Cassella, J. V., "Forced degradation of fentanyl: Identification and analysis of impurities and degradants," *Journal of Pharmaceutical and Biomedical Analysis*, 53, 325-334 (2010).

A review of the GC-MS data analysis for almost all fentanyl seizures demonstrates the presence of 4-ANPP. The presence of 4-ANPP infers that either fentanyl is degrading in such a way as to form propionic acid, as this literature suggests, or that 4-ANPP is another remaining unreacted precursor. Another study found that phototransformation processes that simulated solar radiation formed trace amounts of a chemical designated by the researchers as "TP26", which demonstrates the loss of both the phenyl ring and propionyl group. Jakub Trawiński, J., Szpot, P., Zawadzki, M., Skibiński, R., "Photochemical transformation of fentanyl under the simulated solar radiation—Enhancement of the process by heterogeneous photocatalysis and in silico analysis of toxicity," *Science of The Total Environment* 791, 148171 (2021). Regardless of the source, the presence of propionic acid in the odor of fentanyl seizure materials provides a reliable target for pseudo canine training aid formulation purposes, and research demonstrates that dogs possess the olfactory ability to detect propionic acid in vapor phase dilutions at low odor thresholds. McGann, J. P., "Poor human olfaction is a 19th-century myth," *Science* 356, eaam7263 (2017).

Pseudo Formulations

Once this signature component of propionic acid was identified, a pseudo narcotic formulation was prepared based on prior pseudo narcotic formulations developed by the canine training aids program. The following core formulation was designed to be used in field trials with canines.

Pseudo Narcotic Propionic Acid (PA) Formulation

According to one example, the pseudo narcotic propionic acid (PA) formulation is as follows: (1) 1.6 mL of PA—purchased from Sigma Aldrich (ACS Reagent >99.5%; 402907-100 mL). See Propionic Acid Certificate of Analysis and Safety Data Sheet (SIGMA). (2) 4.00 g Cab-O-Sil M5 (synthetic silicon dioxide)—purchased from Fisher Scientific. See https://www.fishersci.com/shop/products/cab-o-sil-m-5-scintillation-grade-thermo-scientific/AC403731500#?keyword=cab-o-sil. (3) 200 g Avicel PH-101 (pharmaceutical grade microcrystalline cellulose (MCC), 50 µm particle size)—purchased from Fisher Scientific. See https://www.fishersci.com/shop/products/avicel-ph101-50kg/NC1631848?searchHijack=true&searchTerm=NC1631848&searchType=RAPID&matchedCatNo=NC1631848.

An example of preparing a sample includes the following steps:

1. Weigh out 200 g of MCC.
2. Weigh out 4.00 g of Cab-O-Sil and transfer to a mixer (e.g., Black+Decker® PowerCrush™ 700 W Blender).
3. Add 1.6 mL of PA to the Cab-O-Sil.
4. Blend at low speed ("Lo") for 15 seconds two times.
5. Add MCC to the mixture and blend at low speed for 15 seconds.
6. Pulse mixture at high speed ("Hi") for 15 seconds two times.
7. Transfer contents back to pre-tared bag and store in glass jar. Retain samples of this mixture for SPME/GC-MS analysis to verify the formulation odor.

An example for a large-scale batch production includes the following steps:
1. Weigh out 50.0 g of MCC.
2. Weigh out 40.0 g of Cab-O-Sil and transfer to blender.
3. Add 16 mL of PA to the Cab-O-Sil.
4. Blend at low speed for 60 seconds.
5. Add MCC to the mixture and blend at low speed for 60 seconds.
6. Weigh out 2.0 kg MCC and transfer to a large mixer (e.g., Patterson-Kelley P-K Blend Master Lab Blender Model "B").
7. Add the PA/MCC/Cab-O-Sil mixture from Step 5 to the large mixer.
8. Mix for 10 minutes.
9. Remove the mixture material and transfer to packaging materials. Retain samples of this mixture for SPME/GC-MS analysis to verify the formulation odor.

Another embodiment includes substituting 50 μm particle size MCC with 200 μm particle size MCC using Avicel PH-200 (pharmaceutical grade microcrystalline cellulose (MCC))—purchased from Fisher Scientific. See https://www.fishersci.com/shop/products/avicel-ph200-50kg/NC1417856#?keyword=avicel.

An embodiment of this formulation is a modification of the amounts of propionic acid to ensure stability of the training aid material over time (e.g., months, years). Modifying the amounts of propionic acid can also provide for the presentation of varying amounts of pseudo fentanyl odor concentrations to the canine, to represent a variety of the odor concentrations of propionic acid that might be found in fentanyl seizure materials, from trace amounts as might be found in fentanyl residue or tablets that are heavily cut with other materials, to bulk amounts of fentanyl or fentanyl materials of high purity.

Another embodiment involves the addition of other volatile chemicals that are found in the odors of illicitly manufactured fentanyl to form a pseudo fentanyl mixture formulation in addition to or separately from a formulation that contains propionic acid. Law enforcement has detected the presence of several other prominent volatile organic chemicals in the chemical odor profiles from various fentanyl seizures using SPME/GC-MS, including phenethyl chloride (PEC), phenethyl bromide (PEB), acetic acid, and N,N-diethyl aniline. One would expect that pseudo training aid formulations prepared from these chemicals will elicit an alert response from a canine trained on true fentanyl materials that also exhibit these volatile chemical odors, that are present due to the precursors and reagents required for the synthesis of fentanyl. Phenethyl chloride, phenethyl bromide, and acetic acid are known materials used for fentanyl synthesis, and N,N-diethyl aniline is detected in the SPME results for many illicitly manufactured fentanyl seizures. See Fentanyl Purity, Potency, & Synthesis. Real-Time Testing of Opioid Drug Products in the United States, Center for Forensic Science Research and Education (2022); and Steven G. Toske et al., "Organic impurity profiling of fentanyl samples associated with recent clandestine laboratory methods," J. Forensic Sci. 2023; 68:1470-83 (2023). For example, propanoic acid and phenethyl chloride (or any combination of phenethyl chloride, phenethyl bromide, acetic acid, and/or N,N-diethyl aniline) can be combined with different amounts of silicon dioxide and microcrystalline cellulose to produce a mixed-odor pseudo fentanyl formulation. Future law enforcement pseudo fentanyl formulation mixture modifications of this kind can also be based on changes in the chemical odor profile detected for fentanyl seizures as changes are made to the synthetic processes for illicitly manufactured fentanyl.

SPME Analysis of Pseudo Narcotic Formulation

Pseudo narcotic PA was left to sit undisturbed for a minimum of 24 hours to ensure the propionic acid odor was evenly dispersed throughout the mixture material. Two subsamples of 0.5 g of pseudo narcotic PA were transferred into individual SPME headspace glass vials and analyzed via SPME headspace analysis. All SPME/GC-MS analyses were performed using a Shimadzu GC-MS QP-2010 Ultra Plus instrument with an Agilent HP-5 MS UI column installed (30 m length, 250 μm diameter, 0.25 μm thickness) and with hydrogen as the carrier gas. The GC-MS instrument was fitted with an AOC-6000 Plus autosampler that was equipped with a SMART SPME tool.

All samples were analyzed using a splitless mode with a constant $H_2$ pressure of 10 psi and a sampling time of 0.75 min. The inlet temperature was set to 275° C. and the oven was programmed to start at 50° C. (hold for 3.0 min), ramp at 20° C./min to 150° C., and then ramp at 25° C./min to 275° C. (hold for 2.0 min). Blank injections (e.g., no pseudo narcotic present) were run in between samples to ensure the SPME fiber was clean and there was no carryover present.

To verify that the material contained the propionic acid odor, a reference sample for the propionic acid odor was collected by placing a headspace vial upside-down above the propionic acid reagent bottle for 20 seconds, and this reference sample vial was analyzed in the same sequence and under the same SPME/GC-MS conditions as for the pseudo narcotic PA verification.

Figure 5A:
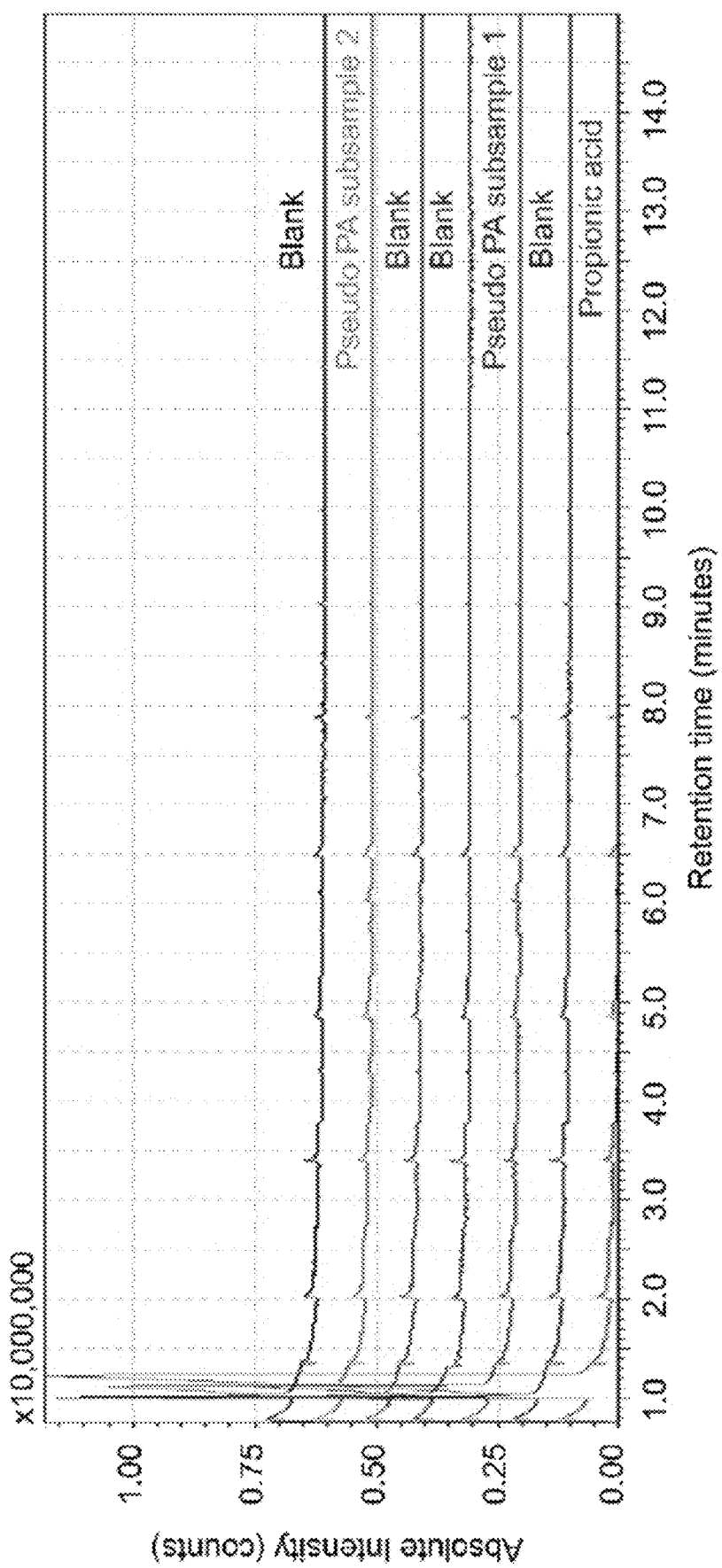
FIG. 5A is a graphical diagram illustrating the SPME/GC-MS verification analysis of samples from the pseudo narcotic propionic acid formulation as compared to neat propionic acid, along with the analysis of the blank injection runs.
Figure 5B:
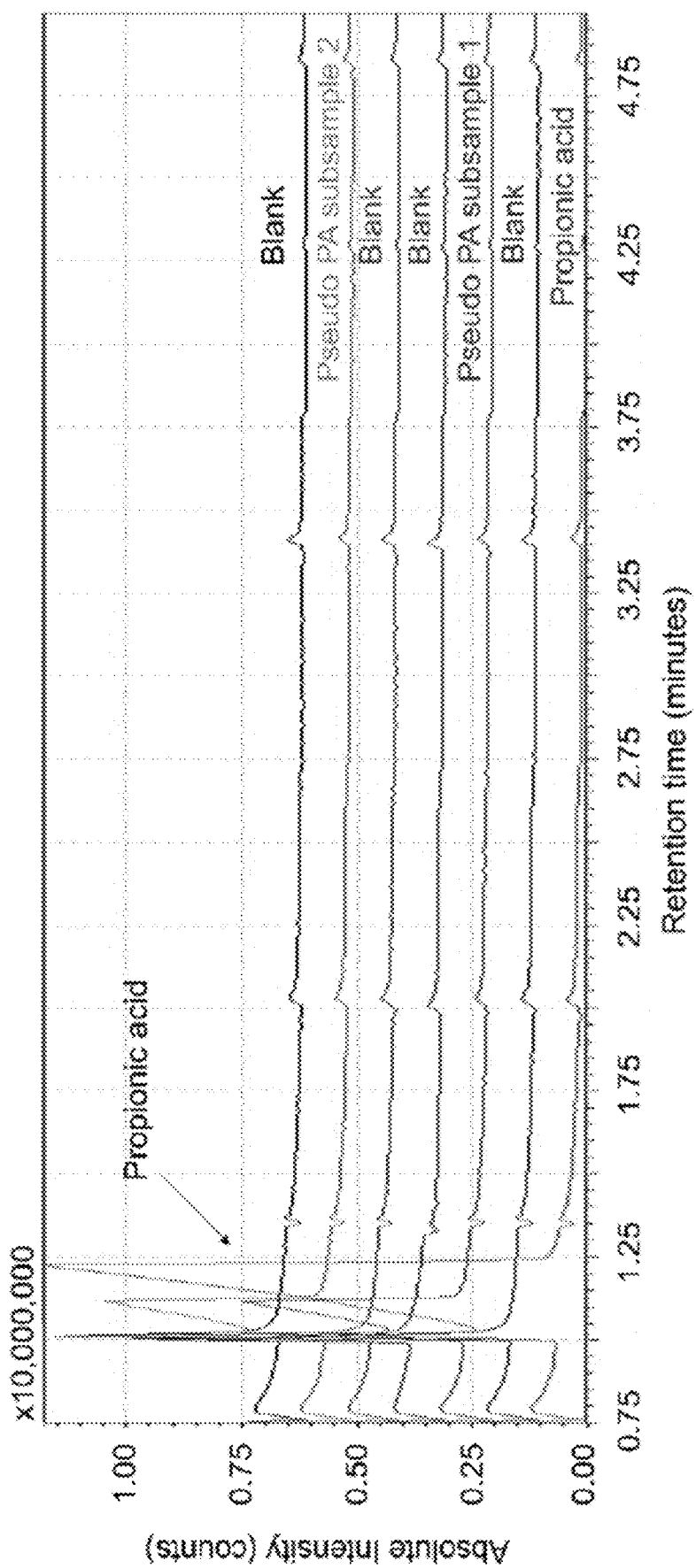
FIG. 5B shows a closeup view of a portion of the graphical diagram of FIG. 5A.

FIG. 5A is a graphical diagram illustrating the SPME/GC-MS verification analysis of samples from the pseudo narcotic propionic acid formulation as compared to neat propionic acid, along with the analysis of the blank injection runs. FIG. 5B shows a closeup view of a portion of the graphical diagram of FIG. 5A. The graphical plot of FIG. 5B has a wider scale (about three times as wide) than the graphical plot of FIG. 5A. The two pseudo narcotic PA subsamples were each found to contain one broad peak (as best seen in FIG. 5B) that was identified as propionic acid by mass spectrum comparison with the Shimadzu library database and by retention time comparison with the retention time of the propionic acid reagent reference headspace vial sample.

Pseudo Narcotic Formulation Preparation

Figure 6:
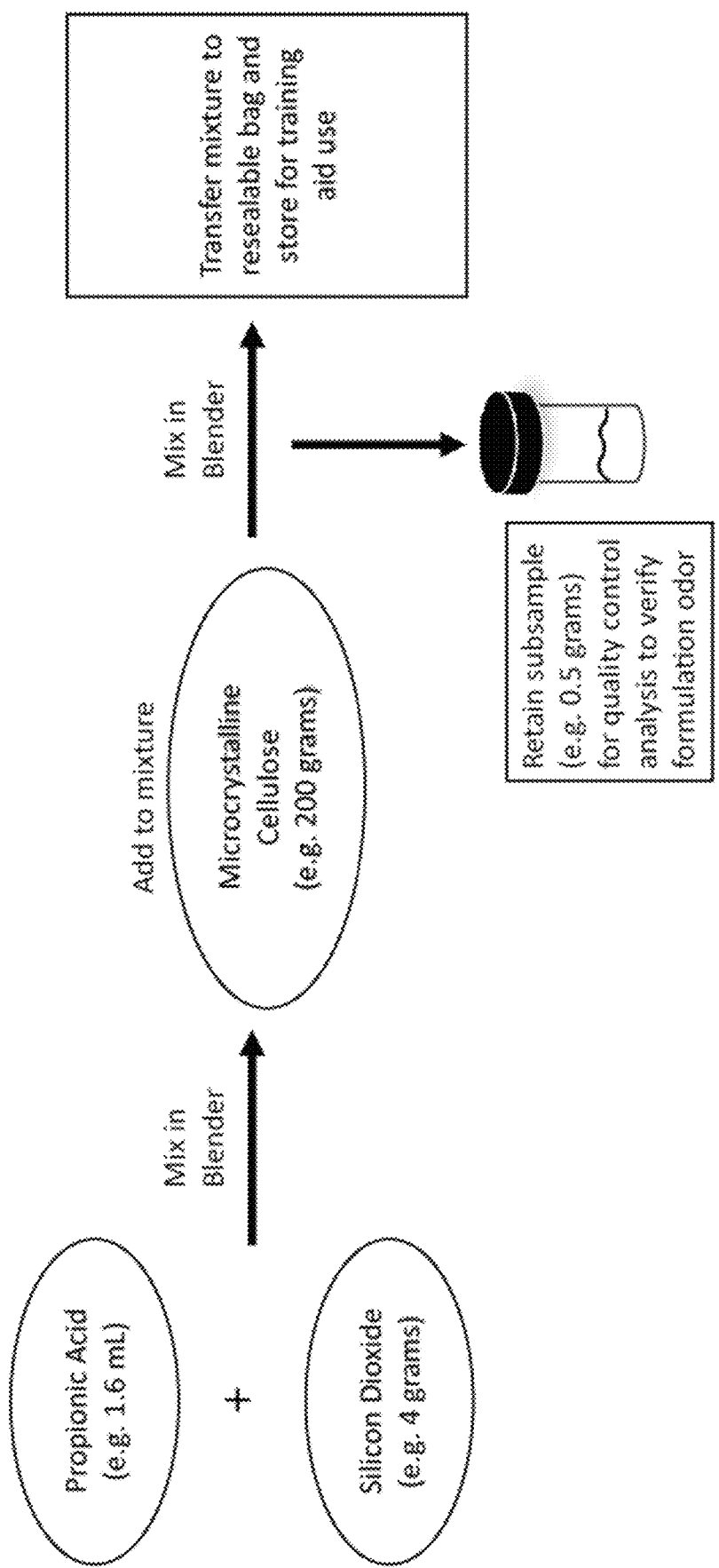
FIG. 6 is a general flow chart of the formulation process steps according to an embodiment.

FIG. 6 is a general flow chart of the formulation process steps according to an embodiment. The propionic acid and the silicon dioxide are mixed in a blender. Microcrystalline cellulose is added to the mixture and mixed in the blender. A subsample is retained for quality control analysis to verify formulation odor. The mixture is transferred to a resealable bag and stored for training aid use. In the specific embodiment shown, the amounts are 1.6 mL propionic acid, 4 g silicon dioxide, and 200 g microcrystalline cellulose (MCC). In other embodiments, the amounts may include (for creating a 10-kg batch of the same concentration, for a range of lower to higher amounts of PA odor availability) 1-80 mL propionic acid, 4-200 g silicon dioxide, and 200-10,000 g MCC. Expressed yet in another way, the pseudo narcotic PA formulation may include 0.484-28.027 wt % propionic acid, 1.951-49.876 wt % silicon dioxide, and 97.564-99.950 wt % MCC.

Canine Detection Trials

Canine detection trials were developed using three Phases to systematically assess the canine olfactory response to the odor of the pseudo fentanyl formulation and performance of the pseudo fentanyl formulation. These trials included odor recognition assessments in controlled, training environments as well as controlled field trials in the operational environment. It is noted that all certified canines used in these trials are called Concealed Humans/Narcotics Detection Dogs (CHNDDs) because they are certified to detect cocaine, ecstasy, fentanyl, heroin, marijuana, and methamphetamine, as well as concealed humans at ports of entry.

The initial odor recognition assessments were conducted in the training academy environment and consisted of two phases of trials with a separate cohort of canines used for each phase. A total of four canines, fully trained and newly certified in the detection of fentanyl, were used for Phase 1. A total of two untrained "green" canines were used for Phase 2. A single chosen assessor with previous training in recognizing canine detection behavior and with no knowledge of the location of the targets, distractors, or blanks, recorded the canine behavior to include "indication" (display of final alert), "interest" (specifically strong interest), or "no response," and was utilized for both phases.

All pseudo fentanyl formulation training aids used for Phase 1 were packaged in fifty-gram amounts in four mil thickness, polyethylene resealable bags. See https://www.u-line.com/BL_211/Uline-4-Mil-Reclosable-Bags?keywords=4Mil+Reclosable+Bags. Phase 2 used varying amounts (five, fifteen, thirty-five, fifty, and one hundred grams) using the same bag type.

Phase 1 of the trial was carried out in two parts and overseen by canine instructors. All tests were carried out in a "double-blind test" format, meaning neither the canine handler nor the data recorder/assessor knew the locations of the targets. The first part of Phase 1 to test the pseudo fentanyl formulation consisted of a simple Odor Recognition Test (ORT) with two canines fully trained and newly certified in the detection of fentanyl. Five new vessels (which hold the targets, distractors, or blanks in the trial lineups) were constructed to avoid contamination and the possibility of any residual odor. Each trial lineup included five vessels, with one vessel containing a target material (a positive control/real fentanyl training aid or the pseudo fentanyl formulation training aid), and the remaining vessels containing either distractors or blanks. Distractor odor materials consisted of acetone, scented lotion, scented soap, permanent ink marker, or a dog treat and blanks consisted of clean polyethylene bags or nitrile gloves. A total of six lineups of vessels were included in the trials: two separate lineups containing a vessel with real fentanyl training aid as the target, three lineups containing a vessel with the pseudo fentanyl formulation training aid, and one lineup of vessels containing only blanks or distractors. The order of the lineups was randomized, as was the location of the target, blank, and distractor vessels within a single lineup, which were also varied for each canine.

The second part of Phase 1 to repeat the testing of the pseudo fentanyl formulation was conducted with two different canines fully trained and newly certified in the detection of fentanyl that were not the same canines used in the earlier trial. This secondary ORT trial was modified to adhere to an updated design protocol. Each lineup or group included six vessels, which contained one target (a positive control/real fentanyl training aid or the pseudo fentanyl formulation training aid), two distractors, and three blanks (except for blank exercises where only blanks and distractors were present). A total of eight lineups were included: three separate lineups containing a real fentanyl training aid as the target, three separate lineups with a pseudo fentanyl formulation training aid as the target, and two lineups of blanks (no target, two distractors, four blanks). The combined results of part one and two of Phase 1 indicated that all four detection canines were able to generalize (or demonstrate odor association) from real fentanyl with the pseudo fentanyl formulation with a 100% detection canine response rate and demonstrated repeatability and reproducibility using two sets of two canines.

Phase 2 of this detection trial was overseen by canine instructors. During Phase 2, two "green" canines were trained and successfully demonstrated odor association to the pseudo fentanyl formulation (validated by ORT trial). Canines were then tested on their ability to generalize (demonstrate odor association) to the target materials of high purity fentanyl citrate (pharmaceutical grade), fentanyl hydrochloride (sourced from seizure materials), and heroin (sourced from seizure materials). Phase 2 used the same detection trial (ORT trial) used in Phase 1 apart from two fewer lineups (removing one control lineup and one blank lineup, with 6 lineups instead of 8 lineups). The pseudo fentanyl formulation used in Phase 2 was a scaled-up production using the same formulation concentrations as Phase 1 in order to provide sufficient total amounts of training aid materials for the "green" canine training and ORT trials. (That is, Phase 2 formulation scaled up to 300 g of MCC, 6.00 g of CabOSil, and 2.4 mL of propionic acid accordingly.) Phase 2 also examined whether a canine trained to the odor of propionic acid may also alert to the odor of heroin, of which acetic acid is the primary odor component of heroin, and acetic acid and propionic acid are very similar in chemical structure. The results of Phase 2 indicated that the detection canines trained to the pseudo fentanyl formulation odor were able to generalize or demonstrate odor association to the fentanyl citrate, fentanyl hydrochloride, and heroin with a 100% detection canine response rate.

After demonstrating that canines display odor association between real fentanyl and the pseudo fentanyl formulation, canine trials were performed to assess performance of the formulation in the operational environment. Whereas the Phase 1 and 2 trials used newly certified canines at the training academy with no operational field experience, the Phase 3 trials primarily used canines with operational field experience, as well as newly certified canines that had recently been deployed to field operations following certification at the academy. Two sets of indoor, controlled trials were performed at this port of entry, as well as one outdoor trial in the operational environment. In the first indoor trial, seven certified CHNDDs were used, of which four canines had been working in the operation environment at this port of entry for several years, and three CHNDDs had just completed certification at the academy and completed familiarization training in the operational environment at this port of entry. A second indoor trial was conducted using eight CHNDDs that were recently temporarily assigned to work at this port of entry but represented CHNDDs with a wider variety of operational experiences at ports of entry in the northwest, northeast, midwest, gulf coast, and southeast United States. All indoor trials were performed using a "single blind" format where the assessors knew the location of the target material, but the location was unknown to each canine handler. Each lineup used six vessels (metal paint cans with holes in the top) with one vessel for the target material, and blanks or distractor materials placed in the other five vessels. The pseudo fentanyl formulation used was triple-bagged using polyethylene resealable bags (same format as used for real fentanyl training aids). An initial lineup with a cocaine training aid was used to familiarize the canines with the trial scenario and blank lineups were interspersed in the trial lineups. Lineups with fentanyl citrate training aids were included in the lineups for the first trial using seven CHNDDs as an additional control lineup.

FIGS. 7A-7E show the results of the first indoor controlled trial with the seven canines that included three newly certified canines and four canines already operating at the port of entry. They include Lineup 1 (Familiarization using Trained Target) and Lineup 2 (Familiarization—Blank) in FIG. 7A, Lineup 3 (Familiarization-Target) and Lineup 4 (FC35) in FIG. 7B, Lineup 5 (PF35) and Lineup 6 (FC5) in FIG. 7C, Lineup 7 (Blank lineup) and Lineup 8 (PF5) in FIG. 7D, and Key and Response descriptions in FIG. 7E.

FIGS. 8A-8D show the results of the subsequent trial using eight different canines that were temporarily assigned to the port of entry. They include Lineup 1 (Familiarization-Target) in FIG. 8A, Lineup 2 (Familiarization-Blank) and Lineup 3 (Familiarization-Target) in FIG. 8B, Lineup 4 (PF-35) and Lineup 5 (PF-5) in FIG. 8C, and Key and Response descriptions in FIG. 8D.

Based on the results of these trials, twelve of fifteen canines demonstrated interest and alert behavior to thirty-five grams of the pseudo fentanyl formulation and fourteen of fifteen canines demonstrated interest and alert behavior to five grams of the pseudo fentanyl formulation presented in a subsequent lineup. Blanks that consisted of mixtures of only silicon dioxide and microcrystalline cellulose (with no target odor chemical added) were also used as negative controls in subsequent lineups.

The same seven CHNDDs that were used in the first indoor trial were used in an operational field trial in an outdoor cargo examination environment. This trial was also conducted using a "single blind" format and a fifty-gram triple-bagged pseudo fentanyl training aid was used. FIG. 9 shows the results of the operational field trials in an outdoor cargo examination environment. Cargo lineups included pallets of imported goods extracted from a commercial truck container and separated across the cargo examination floor. A familiarization lineup was performed using a cocaine training aid. The first lineup with the pseudo fentanyl was performed using pallets of cargo that contained food, and six of seven canines successfully located the source of the training aid odor and demonstrated alert behavior. However, several canines had difficulty pinpointing or quickly finding the exact source of odor, likely due to the dissipation of odor in the outdoor environment or lack of odor availability using triple-bagged packaging of the aid. A second lineup was performed using a cargo lineup that consisted of boxes of clothing packages, using the same fifty-gram training aid with the two outer bag layers removed to increase the odor availability. All seven canines were able to successfully locate the source of the odor and demonstrate alert behavior quickly and precisely in this second lineup.

The outcome of these trials demonstrated the efficacy of the pseudo fentanyl formulation for canine detection purposes and provided the researchers with important data for further implementation and evaluation of the pseudo fentanyl formulation by operational canine handlers. Next steps may include using this information to produce additional pseudo fentanyl formulation training aids for further trials in coordination with various agencies, including state and local law enforcement partners and international border enforcement agencies. This new pseudo fentanyl formulation will provide personnel with a safe, inexpensive, and effective means to conduct fentanyl detection canine training. By providing an additional method to conduct canine fentanyl detection training or by increasing the frequency of which it occurs, the proposed methodology augments the capacity to detect and intercept narcotics operationally, preventing a greater number of illegal drugs from entering our country and communities.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A pseudo narcotic propionic acid (PA) formulation comprising:
   a propionic acid (PA);
   a synthetic silicon dioxide; and
   a microcrystalline cellulose (MCC).

2. The pseudo narcotic PA of claim 1,
   wherein the synthetic silicon dioxide comprises hydrophilic fumed silica.

3. The pseudo narcotic PA of claim 2,
   wherein the MCC comprises a pharmaceutical grade MCC.

4. The pseudo narcotic PA of claim 3,
   wherein the pharmaceutical grade MCC comprises 50 µm particle size.

5. The pseudo narcotic PA of claim 4, comprising 1-80 mL PA and 200-10,000 g pharmaceutical grade MCC,
   wherein the synthetic silicon dioxide comprises 4-200 g hydrophilic fumed silica.

6. The pseudo narcotic PA of claim 5, comprising 1.6 mL PA and 200 g pharmaceutical grade MCC,
   wherein the synthetic silicon dioxide comprises 4 g hydrophilic fumed silica.

7. The pseudo narcotic PA of claim 1, comprising 1-80 mL PA, 4-200 g synthetic silicon dioxide, and 200-10,000 g MCC.

8. The pseudo narcotic PA of claim 1, comprising 0.484-28.027 wt % PA, 1.951-49.876 wt % synthetic silicon dioxide, and 97.564-99.950 wt % MCC.

9. The pseudo narcotic PA of claim 1, further comprising at least one of:
   phenethyl chloride (PEC), phenethyl bromide (PEB), acetic acid, or N,N-diethyl aniline.

10. The pseudo narcotic PA of claim 1,
    wherein the MCC comprises 200 μm particle size.

11. The pseudo narcotic PA of claim 3, comprising 1-80 mL PA and 200-10,000 g pharmaceutical grade MCC,
    wherein the synthetic silicon dioxide comprises 4-200 g hydrophilic fumed silica.

12. The pseudo narcotic PA of claim 11, comprising 1.6 mL PA and 200 g pharmaceutical grade MCC,
    wherein the synthetic silicon dioxide comprises 4 g hydrophilic fumed silica.

* * * * *